US012687044B2

(12) United States Patent
Lei

(10) Patent No.: US 12,687,044 B2
(45) Date of Patent: Jul. 21, 2026

(54) ELECTRONIC LOCK WITH FIXED ZIPPER SLIDER

(71) Applicant: Dongguan City GeShengMei Industrial Co., Ltd, Dongguan (CN)

(72) Inventor: Taotao Lei, Dongguan (CN)

(73) Assignee: Dongguan City GeShengMei Industrial Co., Ltd, Dongguan (CN)

( * ) Notice: Subject to any disclaimer, the term of this patent is extended or adjusted under 35 U.S.C. 154(b) by 0 days.

(21) Appl. No.: 19/014,273

(22) Filed: Jan. 9, 2025

(65) Prior Publication Data

US 2025/0146331 A1 May 8, 2025

(30) Foreign Application Priority Data

Nov. 7, 2024 (CN) ........................ 202422719048.X

(51) Int. Cl.

| | |
|---|---|
| ***E05B 65/52*** | (2006.01) |
| ***A45C 13/10*** | (2006.01) |
| ***E04H 15/64*** | (2006.01) |
| ***E05B 47/00*** | (2006.01) |

(52) U.S. Cl.

CPC ........ *E05B 65/5215* (2013.01); *A45C 13/103* (2013.01); *E04H 15/64* (2013.01); *E05B 47/0001* (2013.01)

(58) Field of Classification Search

CPC ..... A45C 13/103; E05B 45/06; E05B 45/061; E05B 2047/0072; E05B 2047/0073; E05B 49/00; E05B 65/52; E05B 65/5207; E05B 65/5215; E05B 65/523; E05B 65/5284

See application file for complete search history.

(56) References Cited

U.S. PATENT DOCUMENTS

| | | | | |
|---|---|---|---|---|
| 8,661,861 B2 * | 3/2014 | Lai | .......................... | E05B 35/10 70/284 |
| 2018/0368536 A1 * | 12/2018 | Newson | ............... | A45C 13/005 |
| 2020/0022468 A1 * | 1/2020 | Song | .................... | A44B 19/301 |
| 2020/0100574 A1 * | 4/2020 | Bloom | ................ | E05B 47/0001 |
| 2021/0217260 A1 * | 7/2021 | Chen | ...................... | A45C 13/18 |
| 2023/0107279 A1 * | 4/2023 | Yoo | ..................... | H01M 4/1391 429/223 |
| 2025/0143417 A1 * | 5/2025 | Lei | ......................... | A44B 19/28 |
| 2025/0146325 A1 * | 5/2025 | Lei | .......................... | E05B 37/10 |

FOREIGN PATENT DOCUMENTS

| | | | | |
|---|---|---|---|---|
| CN | 108457534 A * | 8/2018 | ............. | E05B 65/52 |
| WO | WO-2025219409 A1 * | 10/2025 | ............. | E05B 65/52 |

* cited by examiner

*Primary Examiner* — Christine M Mills
*Assistant Examiner* — Yahya Sidky

(57) ABSTRACT

An electronic lock with a fixed zipper slider includes a lower clamping plate, a locking assembly, a connecting assembly and an upper clamping plate. The upper clamping plate has a clamping position for clamping a zipper and an unclamping position for releasing the zipper, and the upper clamping plate is connected to the lower clamping plate through the connecting assembly, so that the upper clamping plate is locked at the clamping position relative to the lower clamping plate. The locking assembly has a rotatable encircling member, and a locking area is configured. By rotating the encircling member, the zipper slider is locked in the locking area or the locking area is opened. The lock has easy disassembly and assembly and simple structure.

10 Claims, 3 Drawing Sheets

ELECTRONIC LOCK WITH FIXED ZIPPER SLIDER

CROSS REFERENCE TO RELATED APPLICATIONS

The present application claims the benefit of Chinese Patent Application No. 202422719048X filed on Nov. 7, 2024, the contents of which are incorporated herein by reference in their entirety.

FIELD OF THE INVENTION

The present invention relates to the field of locks, particularly to an electronic lock with a fixed zipper slider.

BACKGROUND OF THE INVENTION

Zippers are common items in daily life, and they are used in a variety of applications such as suitcases, travel backpacks, school bags, handbags, portable tents, and mosquito nets. Most of these items do not come with locking mechanisms, which may lead to the theft, damage, malicious alteration, or exposure of personal belongings or important documents.

However, these items are generally not equipped with locks when purchased. There is commonly a need for the user to lock the zippers temporarily for safety, but it's obvious that the existing locks cannot meet their needs.

Therefore, there is an urgent need for a detachable lock with a combination lock to address the aforementioned issues.

SUMMARY OF THE INVENTION

A purpose of the present invention is to provide an electronic lock with a fixed zipper slider which is detachable, and has easy assembly and simple structure.

In order to achieve the purpose mentioned above, the present invention provides an electronic lock with a fixed zipper slider including a lower clamping plate, a locking assembly, and a connecting assembly. A bottom of the locking assembly corresponding to the lower clamping plate is formed with an upper clamping plate, the upper clamping plate is located above the lower clamping plate, the upper clamping plate has a clamping position for clamping a zipper relative to the lower clamping plate and an unclamping position for releasing the zipper relative to the lower clamping plate, and the upper clamping plate is connected to the lower clamping plate through the connecting assembly, so that the upper clamping plate is locked at the clamping position relative to the lower clamping plate. The locking assembly has a rotatable encircling member, a locking area for locking the zipper slider is formed between the lower clamping plate and the encircling member, and by rotating the encircling member, the zipper slider is locked in the locking area or the locking area is opened.

Preferably, the lower clamping plate includes a main plate and a pressing toothed rack, the pressing toothed rack is arranged on the pressing surface of the main plate.

Preferably, two pressing toothed racks are symmetrically arranged on both sides of the main plate.

Preferably, the connecting assembly includes a threaded hole and a hand screw, the threaded hole is arranged on the upper clamping plate, the lower clamping plate has a locking hole, the hand screw passes through the locking hole and connects with the threaded hole, and the upper clamping plate is locked at the clamping position relative to the lower clamping plate Preferably, the locking assembly further includes a casing, an electronic subassembly, a drive mechanism, and a lock tongue, a bottom of the casing is formed with the upper clamping plate, the electronic subassembly is built into the casing, the drive mechanism is electrically connected to the electronic subassembly, an output end of the drive mechanism is matched with the lock tongue, the lock tongue is slidably arranged in the casing and has a locking position that engages with the encircling member and an unlocking position that disengages from the encircling member relative to the casing, and the lock tongue is switched between the locking position and the unlocking position under the driving of the drive mechanism.

Preferably, the casing has a rotating protrusion, the encircling member has a rotating hole corresponding to the rotating protrusion, the rotating protrusion is rotatably arranged in the rotating hole, and the encircling member has a cover structure.

Preferably, the encircling member has a mating hole, when the lock tongue is in the locking position, the lock tongue extends and engages with the mating hole, when the lock tongue is in the unlocking position, the lock tongue retracts and disengages from the mating hole.

Preferably, the encircling member includes a first rod, a second rod, and a third rod connected in sequence, the first rod is perpendicular to the second rod, the second rod is perpendicular to the third rod, both a free end of the first rod and a free end of the third rod are provided with the rotating hole, and a middle of the first rod is connected to the lock tongue.

Preferably, the drive mechanism is a drive motor, an output end of the drive motor has an extendable and retractable pushing part, the lock tongue always tends to move from the unlocking position to the locking position, and the lock tongue has a matching drive part corresponding to the pushing part; the pushing part is extended to push the matching drive part, driving the lock tongue to move from the unlocking position to the locking position; or, the drive mechanism includes an electrostrictive wire.

Preferably, the lower clamping plate is extended outward to form a bottom support plate for accommodating the zipper slider.

Compared with the prior art, the electronic lock of the present invention combines a lower clamping plate, a locking assembly, and a connecting assembly. The bottom of the locking assembly corresponds to the lower clamping plate to form an upper clamping plate, which is located above the lower clamping plate. The upper clamping plate has a clamping position for clamping a zipper relative to the lower clamping plate and an unclamping position for releasing the zipper. The upper clamping plate and the lower clamping plate are connected through the connecting assembly so that the upper clamping plate is locked at the clamping position relative to the lower clamping plate. By clamping between the upper and lower clamping plates, the electronic lock with a fixed zipper slider of the present invention can be fixed on any device with a zipper. When in use, the user simply needs to open the zipper to be installed, and place the electronic lock with a fixed zipper slider at the end of the zipper, with the upper clamping plate and the lower clamping plate positioned on the top and bottom sides of the zipper end, respectively. The upper clamping plate and the lower clamping plate are connected through the connecting assembly, so that the upper clamping plate is locked at the clamping position relative to the lower clamping plate. By clamping the sides of the zipper between the upper and lower clamping plates, the electronic lock with a fixed zipper slider is now fixed on the zipper, thus achieving a detachable connection between the electronic lock with a fixed zipper slider and the zipper. The locking assembly has a rotatable encircling member, and a locking area for locking the zipper slider is formed between the lower clamping plate and the encircling member. The zipper slider is locked in the locking area or the locking area is opened by rotating the encircling member. In other words, the locking or unlocking of the zipper slider is achieved by opening or closing the locking area.

DETAILED DESCRIPTION OF ILLUSTRATED EMBODIMENTS

To provide a detailed explanation of the technical content, and structural features of the present invention, the following is further explained in conjunction with the implementation method and the accompanying drawings.

Figure 1:
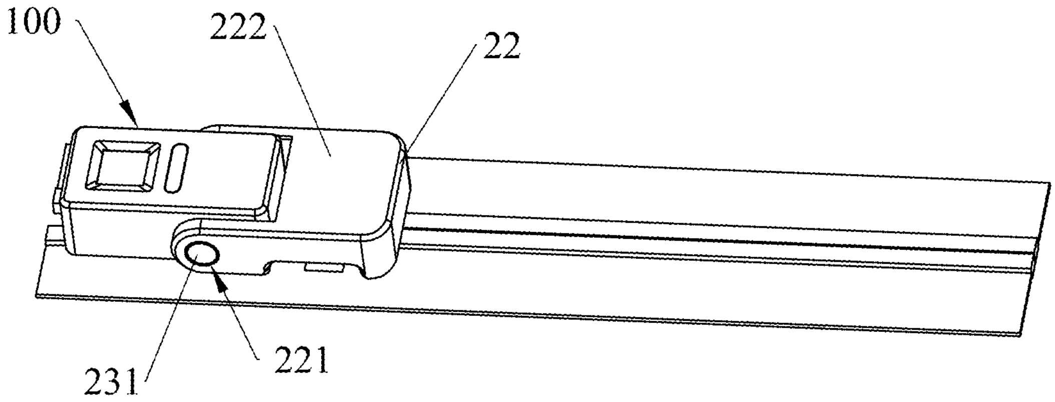
FIG. 1 is a perspective view of the electronic lock with a fixed zipper slider according to an embodiment of the present invention when connected with a zipper.
Figure 2:
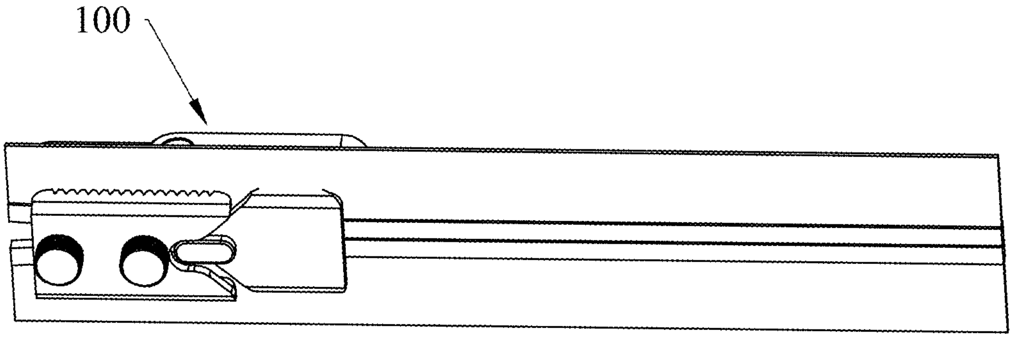
FIG. 2 is another perspective view of the electronic lock with a fixed zipper slider according to an embodiment of the present invention when connected with a zipper.

Referring to FIGS. 1 to 6, the electronic lock with a fixed zipper slider 100 according to the present invention includes a lower clamping plate 1, a locking assembly 2, and a connecting assembly 3. The bottom of the locking assembly 2 corresponding to the lower clamping plate 1 is formed with an upper clamping plate 21. The upper clamping plate 21 is located above the lower clamping plate 1 and has a clamping position (as shown in FIGS. 1-2) for clamping a zipper relative to the lower clamping plate 1, and an unclamping position for releasing the zipper. The upper clamping plate 21 and the lower clamping plate 1 are connected through the connecting assembly 3 so that the upper clamping plate 21 is locked at the clamping position relative to the lower clamping plate 1. By clamping between the upper and lower clamping plates 21 and 1, the electronic lock 100 of the present invention can be fixed on any device with a zipper. When in use, the user simply needs to open the zipper to be installed, place the electronic lock 100 at the end of the zipper, with the upper clamping plate 21 and the lower clamping plate 1 positioned on the top and bottom sides of the zipper end, respectively. The upper clamping plate 21 and the lower clamping plate 1 are connected through the connecting assembly 3, so that the upper clamping plate 21 is locked at the clamping position relative to the lower clamping plate 1. By clamping the sides of the zipper between the upper and lower clamping plates 21 and 1, the electronic lock 100 is now fixed on the zipper, thus achieving a detachable connection between the electronic lock 100 and the zipper. The locking assembly 2 has a rotatable encircling member 22. A locking area for locking the zipper slider 20 is formed between the lower clamping plate 1 and the encircling member 22. The zipper slider 20 can be locked in the locking area or the locking area can be opened by rotating the encircling member 22. In other words, the locking or unlocking of the zipper slider 20 is achieved by opening or closing the locking area.

Figure 3:
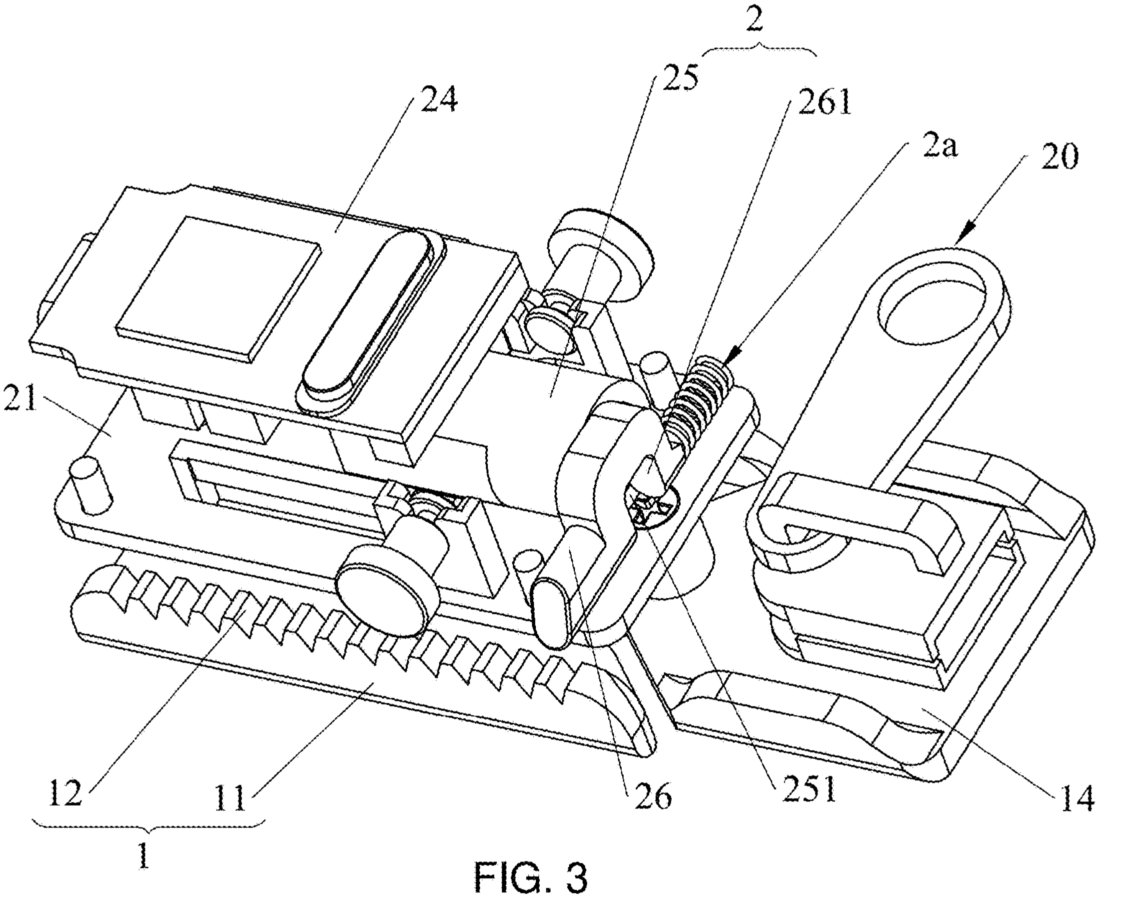
FIG. 3 is an internal structure view of the electronic lock with a fixed zipper slider according to an embodiment of the present invention.
Figure 4:
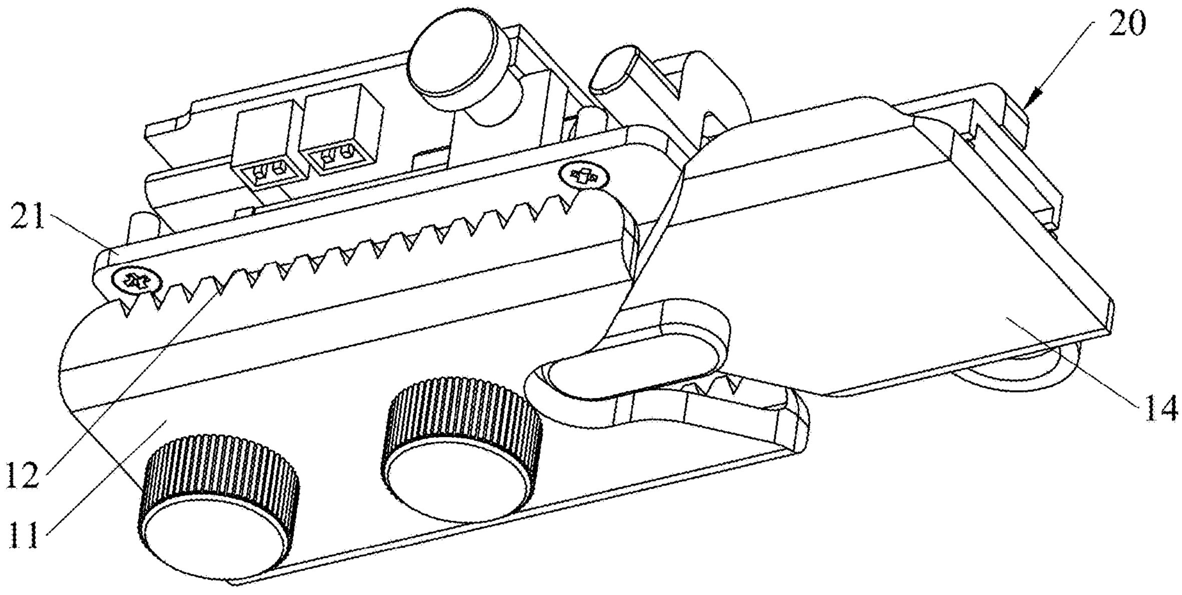
FIG. 4 is an internal structure view of the electronic lock with a fixed zipper slider according to an embodiment of the present invention.
Figure 5:
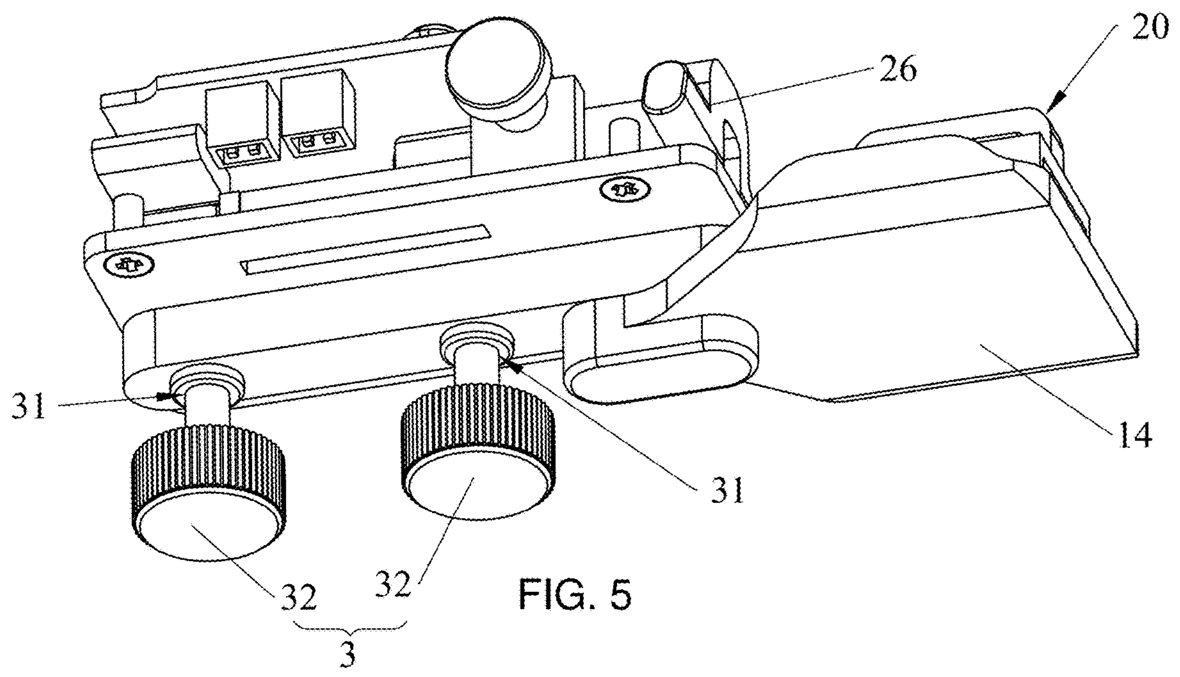
FIG. 5 is an internal structure view of the electronic lock with a fixed zipper slider according to an embodiment of the present invention.

More specifically, referring to FIGS. 3 to 4, the lower clamping plate 1 includes a main plate 11 and a pressing toothed rack 12, which is arranged on the pressing surface of the main plate 11. The pressing toothed rack 12 is skidproof. Preferably, the pressing toothed racks 12 are symmetrically arranged on both sides of the main plate 11. For example, the connecting assembly 3 includes a threaded hole 31 and a hand screw 32. The threaded hole 31 is arranged on the upper clamping plate 21, and the lower clamping plate 1 has a locking hole (not shown). The hand screw 32 passes through the locking hole and connects with the threaded hole 31, so that the upper clamping plate 21 is locked at the clamping position relative to the lower clamping plate 1.

Referring to FIGS. 3 to 6, the locking assembly 2 further includes a casing 23, an electronic subassembly 24, a drive mechanism 25, and a lock tongue 26. The bottom of the casing 23 is formed with the upper clamping plate 21. The electronic subassembly 24 is built into the casing 23, and the drive mechanism 25 is electrically connected to the electronic subassembly 24. The output end of the drive mechanism 25 is matched with the lock tongue 26. The lock tongue 26 is slidably arranged in the casing 23 and has a locking position that engages with the encircling member 22 and an unlocking position that disengages from the encircling member 22 relative to the casing 23. The lock tongue 26 is switched between the locking position and the unlocking position under the drive of drive mechanism 25.

Referring to FIGS. 1 to 6, the encircling member 22 has a mating hole 223. When the lock tongue 26 is in the locking position, the lock tongue 26 extends and engages with the mating hole 223. When the lock tongue 26 is in the unlocking position, the lock tongue 26 retracts and disengages from the mating hole 223, thereby allowing the encircling member 22 to rotate freely.

Referring to FIGS. 3 to 4, the drive mechanism 25 is a drive motor, and the output end of the drive motor has an extendable and retractable pushing part 251. The lock tongue 26 always tends to move from the unlocking position to the locking position, and the lock tongue 26 has a matching drive part 261 corresponding to the pushing part 251. Thus, the matching drive part 261 can be pushed by the pushing part, thereby driving the lock tongue 26 to move from the unlocking position to the locking position.

Referring to FIGS. 1 to 6, the locking assembly 2 further includes an elastic member 2*a*, which provides an elastic force that always tends to move the lock tongue 26 from the unlocking position to the locking position. In other embodiments, the drive mechanism 25 includes an electrostrictive wire which is a special material that will be contracted when energized. As a result, the contraction of the electrostrictive wire drives the mechanical movement of the lock tongue 26, thereby achieving the purpose of unlocking and locking.

Refer to FIG. 1, the casing 23 has a rotating protrusion 231, and the encircling member 22 has a rotating hole 221 corresponding to the rotating protrusion 231. The rotating protrusion 231 is rotatably arranged in the rotating hole 221. The cooperation between the rotating protrusion 231 and the rotating hole 221 allows the encircling member 22 to move more smoothly. Specifically, the encircling member 22 has a cover 222, which can cover the zipper slider 20. The lower clamping plate 1 is extended outward to form a bottom support plate 14 for accommodating the zipper slider 20, thereby facilitating the zipper slider 20 to enter or exit.

Figure 6:
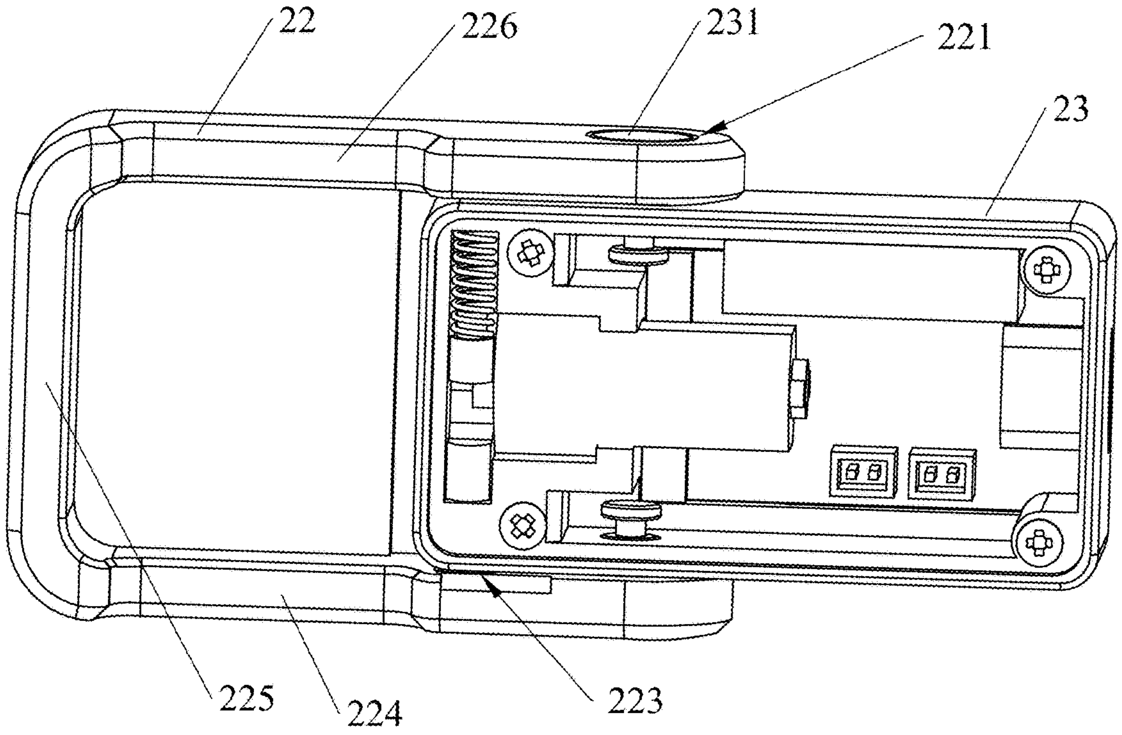
FIG. 6 is an internal structure view of the electronic lock with a fixed zipper slider according to an embodiment of the present invention.

Refer to FIG. 6, the encircling member 22 includes a first rod 224, a second rod 225, and a third rod 226 connected in sequence. The first rod 224 is perpendicular to the second rod 225, and the second rod 225 is perpendicular to the third rod 226. Both the free end of the first rod 224 and the free end of the third rod 226 are provided with the rotating holes 221. The middle of the first rod 224 is connected to the lock tongue 26.

Referring to FIGS. 3 to 6, the electronic subassembly 24 includes a touch panel, a charging port, a battery, and an indicator light. The battery is built into the casing 23. The touch panel is electrically connected to the battery. The charging port is located on the casing 23 and is electrically connected to the battery. The indicator light is located on the touch panel. The drive mechanism 25 is electrically connected to both the touch panel and the battery.

Referring to FIGS. 1 to 6, the working process of the electronic lock 100 of the present invention follows.

When in use, the user simply needs to open the zipper to be installed, and place the electronic lock 100 at the end of the zipper, with the upper clamping plate 21 and the lower clamping plate 1 positioned on the top and bottom sides of the zipper end, respectively. The upper clamping plate 21 and the lower clamping plate 1 are connected through the connecting assembly 3, thus the upper clamping plate 21 is locked at the clamping position relative to the lower clamping plate 1. By clamping the sides of the zipper between the upper and lower clamping plates, the electronic lock 100 is fixed on the zipper.

By manually operating the touch panel or button to activate the drive mechanism 25, the pushing part 251 is extended under the drive of the drive mechanism 25; as a result, the extension of the pushing part 251 pushes the matching drive part 261 and drives the lock tongue 26 to move from the locking position to the unlocking position, and the encircling member 22 is rotated to close the locking area, thereby achieving the locking of the zipper slider.

By manually operating the touch panel or button to activate the drive mechanism 25, the pushing part 251 is retracted under the drive of the drive mechanism 25; as a result, the retraction of the pushing part 251 allows the lock tongue 26 to move from the unlocked position to the locked position under the action of the elastic member. Accordingly, the lock tongue 26 extends into the mating hole 223 to restrict the rotation of the encircling member 22, thereby achieving the locking function.

To unlock, by manually operating the touch panel using a personal fingerprint or a password to activate the drive mechanism 25, the drive mechanism 25 causes the pushing part 251 to extend. The extension of the pushing part 251 pushes against the matching drive part 261 and moves the lock tongue 26 from the locked position to the unlocked position. When the lock tongue 26 is in the unlocked position, it retracts and disengages from the mating hole 223, allowing the encircling member 22 to rotate freely so as to open the locking area, thereby achieving the unlocking of the zipper slider 20.

By combining the lower clamping plate 1, the locking assembly 2, and the connecting assembly 3, the bottom of the locking assembly 2 corresponding to the lower clamping plate 1 is formed with the upper clamping plate 21. The upper clamping plate 21 is located above the lower clamping plate 1, and has a clamping position for clamping the zipper relative to the lower clamping plate 1 and an unclamping position for releasing the zipper. The upper clamping plate 21 and the lower clamping plate 1 are connected through the connecting assembly 3 so that the upper clamping plate 21 is locked at the clamping position relative to the lower clamping plate 1. By clamping between the upper and lower clamping plates, the electronic lock 100 of the present invention can be fixed on any device with a zipper. When in use, the user simply needs to open the zipper to be installed, and place the electronic lock 100 at the end of the zipper, with the upper clamping plate 21 and the lower clamping plate 1 positioned on the top and bottom sides of the zipper end, respectively. The upper clamping plate 21 and the lower clamping plate 1 are connected through the connecting assembly 3, so that the upper clamping plate 21 is locked at the clamping position relative to the lower clamping plate 1. By clamping the sides of the zipper between the upper and lower clamping plates, the electronic lock 100 is now fixed on the zipper, thus achieving a detachable connection between the electronic lock 100 and the zipper. The locking assembly 2 has a rotatable encircling member 22. A locking area for locking the zipper slider 20 is formed between the lower clamping plate 1 and the encircling member 22. The zipper slider can be locked in the locking area or the locking area can be opened by rotating the encircling member 22. In other words, the locking or unlocking of the zipper slider is achieved by opening or closing the locking area.

The above disclosure is only a preferred example of the present invention and cannot be used to limit the scope of rights of the present invention. Therefore, any equivalent changes made in accordance with the claims of the present invention are within the scope of the present invention.

What is claimed is:

1. An electronic lock with a fixed zipper slider, comprising a lower clamping plate, a locking assembly, and a connecting assembly, wherein a bottom of the locking assembly corresponding to the lower clamping plate is formed with an upper clamping plate, the upper clamping plate is located above the lower clamping plate, the upper clamping plate has a clamping position for clamping a zipper relative to the lower clamping plate, and an unclamping position for releasing the zipper relative to the lower clamping plate, the upper clamping plate and the lower clamping plate are connected through the connecting assembly so that the upper clamping plate is locked at the clamping position relative to the lower clamping plate, the locking assembly has a rotatable encircling member, a locking area for locking the zipper slider is formed between the lower clamping plate and the encircling member, and by rotating the encircling member, the zipper slider is locked in the locking area or the locking area is opened;

wherein the locking assembly further comprises a casing, an electronic subassembly, a drive mechanism, and a lock tongue, a bottom of the casing is formed with the upper clamping plate, the electronic subassembly is built into the casing, the drive mechanism is electrically connected to the electronic subassembly, an output end of the drive mechanism is matched with the lock tongue, the lock tongue is slidably arranged in the casing and has a locking position that engages with the encircling member and an unlocking position that disengages from the encircling member relative to the casing, and the lock tongue is switched between the locking position and the unlocking position under the driving of the drive mechanism;

wherein the casing has a rotating protrusion, the encircling member has a rotating hole corresponding to the rotating protrusion, the rotating protrusion is rotatably arranged in the rotating hole, and the encircling member has a cover structure.

2. The electronic lock with the fixed zipper slider according to claim 1, wherein the lower clamping plate comprises a main plate and a pressing toothed rack, the pressing toothed rack is arranged on a pressing surface of the main plate.

3. The electronic lock with the fixed zipper slider according to claim 2, wherein two pressing toothed racks are symmetrically arranged on both sides of the main plate.

4. The electronic lock with the fixed zipper slider according to claim 1, wherein the connecting assembly comprises a threaded hole and a hand screw, the threaded hole is arranged on the upper clamping plate, the lower clamping plate has a locking hole, the hand screw passes through the locking hole and connects with the threaded hole, and the upper clamping plate is locked at the clamping position relative to the lower clamping plate.

5. The electronic lock with the fixed zipper slider according to claim 1, wherein the encircling member has a mating hole, when the lock tongue is in the locking position, the lock tongue extends and engages with the mating hole, when the lock tongue is in the unlocking position, the lock tongue retracts and disengages from the mating hole.

6. The electronic lock with the fixed zipper slider according to claim 1, wherein the encircling member comprises a first rod, a second rod, and a third rod connected in sequence, the first rod is perpendicular to the second rod, the second rod is perpendicular to the third rod, both a free end of the first rod and a free end of the third rod are provided with the rotating hole, and a middle of the first rod is connected to the lock tongue.

7. The electronic lock with the fixed zipper slider according to claim 1, wherein the drive mechanism is a drive motor, an output end of the drive motor has an extendable and retractable pushing part, the lock tongue always tends to move from the unlocking position to the locking position, and the lock tongue has a matching drive part corresponding to the pushing part; the pushing part is extended to push the matching drive part, driving the lock tongue to move from the unlocking position to the locking position; or, the drive mechanism includes an electrostrictive wire.

8. The electronic lock with the fixed zipper slider according to claim 1, wherein the lower clamping plate is extended outward to form a bottom support plate for accommodating the zipper slider.

9. An electronic lock with a fixed zipper slider, comprising a lower clamping plate, a locking assembly, and a connecting assembly, wherein a bottom of the locking assembly corresponding to the lower clamping plate is formed with an upper clamping plate, the upper clamping plate is located above the lower clamping plate, the upper clamping plate has a clamping position for clamping a zipper relative to the lower clamping plate, and an unclamping position for releasing the zipper relative to the lower clamping plate, the upper clamping plate and the lower clamping plate are connected through the connecting assembly so that the upper clamping plate is locked at the clamping position relative to the lower clamping plate, the locking assembly has a rotatable encircling member, a locking area for locking the zipper slider is formed between the lower clamping plate and the encircling member, and by rotating the encircling member, the zipper slider is locked in the locking area or the locking area is opened;

wherein the locking assembly further comprises a casing, an electronic subassembly, a drive mechanism, and a lock tongue, a bottom of the casing is formed with the upper clamping plate, the electronic subassembly is built into the casing, the drive mechanism is electrically connected to the electronic subassembly, an output end of the drive mechanism is matched with the lock tongue, the lock tongue is slidably arranged in the casing and has a locking position that engages with the encircling member and an unlocking position that disengages from the encircling member relative to the casing, and the lock tongue is switched between the locking position and the unlocking position under the driving of the drive mechanism;

wherein the encircling member has a mating hole, when the lock tongue is in the locking position, the lock tongue extends and engages with the mating hole, when the lock tongue is in the unlocking position, the lock tongue retracts and disengages from the mating hole.

10. An electronic lock with a fixed zipper slider, comprising a lower clamping plate, a locking assembly, and a connecting assembly, wherein a bottom of the locking assembly corresponding to the lower clamping plate is formed with an upper clamping plate, the upper clamping plate is located above the lower clamping plate, the upper clamping plate has a clamping position for clamping a zipper relative to the lower clamping plate, and an unclamping position for releasing the zipper relative to the lower clamping plate, the upper clamping plate and the lower clamping plate are connected through the connecting assembly so that the upper clamping plate is locked at the clamping position relative to the lower clamping plate, the locking assembly has a rotatable encircling member, a locking area for locking the zipper slider is formed between the lower clamping plate and the encircling member, and by rotating the encircling member, the zipper slider is locked in the locking area or the locking area is opened;

wherein the locking assembly further comprises a casing, an electronic subassembly, a drive mechanism, and a lock tongue, a bottom of the casing is formed with the upper clamping plate, the electronic subassembly is built into the casing, the drive mechanism is electrically connected to the electronic subassembly, an output end of the drive mechanism is matched with the lock tongue, the lock tongue is slidably arranged in the casing and has a locking position that engages with the encircling member and an unlocking position that disengages from the encircling member relative to the casing, and the lock tongue is switched between the locking position and the unlocking position under the driving of the drive mechanism;

wherein the drive mechanism is a drive motor, an output end of the drive motor has an extendable and retractable pushing part, the lock tongue always tends to move from the unlocking position to the locking position, and the lock tongue has a matching drive part corresponding to the pushing part; the pushing part is extended to push the matching drive part, driving the lock tongue to move from the unlocking position to the locking position; or, the drive mechanism includes an electrostrictive wire.

* * * * *